US012752292B2

(12) United States Patent
Kun et al.

(10) Patent No.: US 12,752,292 B2
(45) Date of Patent: Oct. 6, 2026

(54) OIL SPRAYER

(71) Applicant: DONGGUAN JIHUI ELECTRONICS & PLASTICS PRODUCTS CO, LTD, Dongguan City (CN)

(72) Inventors: Chi Fai Kun, Dongguan City (CN); Zhidan Wang, Hunan (CN)

(73) Assignee: DONGGUAN JIRUI ELECTRONICS & PLASTICS PRODUCTS CO, LTD, Dongguan City (CN)

( * ) Notice: Subject to any disclaimer, the term of this patent is extended or adjusted under 35 U.S.C. 154(b) by 129 days.

(21) Appl. No.: 18/755,494

(22) Filed: Jun. 26, 2024

(65) Prior Publication Data

US 2026/0001091 A1 Jan. 1, 2026

(51) Int. Cl.
*B05B 11/10* (2023.01)
*B05B 15/30* (2018.01)
*B05B 15/63* (2018.01)

(52) U.S. Cl.
CPC ......... *B05B 11/104* (2023.01); *B05B 11/1011* (2023.01); *B05B 11/1047* (2023.01); *B05B 11/1057* (2023.01); *B05B 11/1074* (2023.01); *B05B 15/30* (2018.02); *B05B 15/63* (2018.02)

(58) Field of Classification Search
CPC ............... B05B 11/104; B05B 11/1047; B05B 11/1057; B05B 11/1074; B05B 15/30; B05B 15/63; B05B 11/1011
See application file for complete search history.

(56) References Cited

U.S. PATENT DOCUMENTS 5,031,798 A * 7/1991 Wild ..................... B05B 11/026 222/105
11,154,886 B2 * 10/2021 Maas .................. B05B 11/1047
2002/0008164 A1 * 1/2002 Yanagida ............ B05B 12/0026 239/525
2018/0318858 A1 * 11/2018 Maas .................... B05B 11/104
2023/0211364 A1 * 7/2023 Van Den Heuvel ......................... B05B 11/1011 222/401

* cited by examiner

Primary Examiner — Frederick C Nicolas
(74) *Attorney, Agent, or Firm* — Abd Almonem Doolaanea

(57) ABSTRACT

Disclosed is an oil spray bottle, including an oil storage container, a shroud shell and an oil pumping module. In order to facilitate the pouring of oil into the oil storage container, the oil storage container is designed to be capable of being detached from the oil pumping module, the oil storage container is in threaded connection with the oil pumping module, that is, an external thread is formed at an opening of the oil storage container, and an inner thread is formed on an inner wall of the oil pumping module; and in order to hide the oil pumping module, improve its aesthetics and enable a user to hold the oil spray bottle easily, the shroud shell is fixed to an outside of the oil pumping module.

10 Claims, 11 Drawing Sheets

OIL SPRAYER

TECHNICAL FIELD

The present disclosure relates to the technical field of oil pots, and particularly relates to an oil spray bottle.

BACKGROUND

An oil sprayer, also known as an oil spray pot or an oil spray bottle, is a kitchen tool typically used to precisely spray cooking oil or other liquid ingredients during cooking. The liquid ingredients can be sprayed out from the oil sprayer through compressed air or manual mechanical action to form fine mist, making it easier to color the food evenly, improve aroma of the food, and provide additional seasoning.

Search reveals that a liquid dispensing apparatus is disclosed by an existing patent (U.S. Pat. No. 11,154,886B2), which discloses in the public technical content:

1. It involves a trigger (that is, a handle). As can be seen from FIGS. 14, 23 and 41 therein, springback of the trigger depends on an arcuate arm integrally connected to the trigger. When the trigger is pressed, the arcuate arm is accordingly pressed and deformed. Once the trigger is stopped from being touched and pressed, the arcuate arm pushes the trigger back to its original position. This springback structure integrating the trigger and the arcuate arm requires the springback capability of the arcuate structure is much greater than that of the trigger, therefore, different materials with distinct springback properties are used for these two structures, that is, a special mold is required to mold the different materials with distinct springback properties into an entirety through injection molding, which involves a complex process and high costs.

2. It further involves an oil outlet nozzle (that is, an atomizing nozzle). As can be seen from FIGS. 37 and 55 therein, the control of oil dispensing depends on a convex deformation of a dome of a dome valve through an oil pressure; after the deformation, the dome will open an oil outlet channel, allowing the oil to spray out. This structure for oil dispensing is not highly reliable and is prone to malfunctions due to the inherent structural characteristics of the dome valve. Once the dome valve fails to springback or deform properly, the function of oil dispensing will cease to work.

In summary, based on the two identified issues, further optimization is made and an oil spray bottle is provided.

SUMMARY

In view of the defects in the prior art, the present disclosure provides an oil spray bottle, which solves the problems existing in the background art.

In order to implement the above objectives, the present disclosure adopts the following technical solution: an oil spray bottle, including an oil storage container, a shroud shell and an oil pumping module, the oil storage container and the oil pumping module can be disassembled and assembled, and the shroud shell is fixed to an outside of the oil pumping module;

the oil pumping module includes an oil pumping shell body and a handle, the handle can reciprocate rotationally at a top end of the oil pumping shell body, a trigger protrusion is integrally connected to an interior of the handle, an oil pumping piston is movably disposed at a top of the oil pumping shell body, the trigger protrusion is abutted against the oil pumping piston, and the oil pumping piston and the oil pumping shell body are both abutted against a first spring there between; and the oil pumping module further includes an atomizing nozzle fixedly snap-fitted on the top end of the oil pumping shell body, the atomizing nozzle has a nozzle shell as a main body structure thereof, a fifth oil channel is formed at a bottom of the nozzle shell, a spring limiting cylinder is integrally connected to a top of the nozzle shell, an oil outlet piston is movably disposed inside the spring limiting cylinder, the oil outlet piston and the spring limiting cylinder are both abutted against a third spring a reverse thrusting groove is formed on an outer portion of the oil outlet piston, a plunger is connected to an end portion of the oil outlet piston, an oil outlet piston cylinder is connected to an end portion of the nozzle shell, the plunger is capable of blocking an oil outlet channel of the oil outlet piston cylinder.

Further, a reserved handle hole and a first reserved nozzle hole are formed on a side portion of the shroud shell, a handle is exposed to an outside through the first reserved handle hole, and an atomizing nozzle is exposed to an outside through the reserved nozzle hole.

Further, the oil pumping shell body includes a container connecting shell, the container connecting shell is in threaded connection with the opening of the oil storage container, an upper portion of the container connecting shell is integrally connected to a connecting shell, an upper portion of the connecting shell is integrally connected to an oil pumping piston cylinder, a first oil channel is formed on one side of the oil pumping piston cylinder, a valve body accommodating cavity is formed inside the connecting shell, a second oil channel and a third oil channel are formed on a top of the connecting shell, the connecting shell is communicated with the oil pumping piston cylinder through the second oil channel and the third oil channel.

Further, a handle connecting protrusion is integrally connected to the other side of the oil pumping piston cylinder, and one shaft hole is formed on both front and back sides of the handle connecting protrusion; and a shaft body is symmetrically connected to an end portion of the handle, the shaft body is rotationally connected into the shaft holes, a second reserved nozzle hole is formed on a top of the handle, and an atomizing nozzle extends to a position above the handle through the second reserved nozzle hole.

Further, an oil pumping valve is connected inside the oil pumping shell body, the oil pumping valve includes a sleeve fixed inside the oil pumping shell body, an oil storage piston cylinder is fixedly engaged inside the sleeve, a fourth oil channel is formed on a top of the oil storage piston cylinder, an oil pumping connecting pipe is connected to a side of the oil storage piston cylinder, an oil suction pipe is connected to a bottom end of the oil pumping connecting pipe, an oil filter is connected to a bottom end of the oil suction pipe.

Further, a valve core is connected to an inner top side of the oil storage piston cylinder, a first valve core tube is disposed on one side of an interior of the valve core, a second valve core tube is disposed on the other side of the interior of the valve core, a first valve ball is movably disposed inside the first valve core tube, and a second valve ball is movably disposed inside the second valve core tube.

Further, an oil storage piston is movably connected to an interior of the oil storage piston cylinder, a piston supporting rod is fixedly connected to an interior of the oil storage piston, a second spring is sleeved outside the piston supporting rod, the second spring is abutted between the piston supporting rod and the oil storage piston cylinder.

Further, the fourth oil channel is communicated with the oil storage piston cylinder and the first valve core tube, the oil pumping connecting pipe is communicated with the second valve core tube, and the oil storage piston cylinder is communicated with the first oil channel.

Further, the fifth oil channel is communicated with the first oil channel, an exhaust hole is reserved and formed on a side wall of spring limiting cylinder, and an oil reservoir is reserved between the spring limiting cylinder and the nozzle shell.

Further, an atomizing head is connected to an end portion of the oil outlet piston cylinder, a nozzle cover is connected to an outer side of the end portion of the nozzle shell, and an oil spraying outlet of the atomizing head extends to an outside of the nozzle cover.

The present disclosure provides an oil spray bottle. Compared with the prior art, the present disclosure has the following beneficial effects:

1. For the oil spray bottle, a trigger protrusion made of the material same as that of the handle is integrally formed inside the handle, the trigger protrusion can synchronize the arc-shaped motion trajectory of the handle and press the oil pumping piston during the motion, and the springback of the spring can press the trigger protrusion to facilitate the reset of the handle. Compared with the arcuate arm in the prior art, the present disclosure features a more reliable structural strength and simple production and assembly.
2. For the oil spray bottle, the piston structure is disposed inside the atomizing nozzle, and the piston is reversely pushed through the oil pressure, such that the oil outlet channel can be opened. The piston can block the oil outlet channel again under the driving of the reaction force of the spring when there is no oil pressure. Compared with a dome valve in the prior art, the structure of oil outlet control of the present disclosure is more reliable, and the oil outlet effect can be further ensured.

Figure 1:
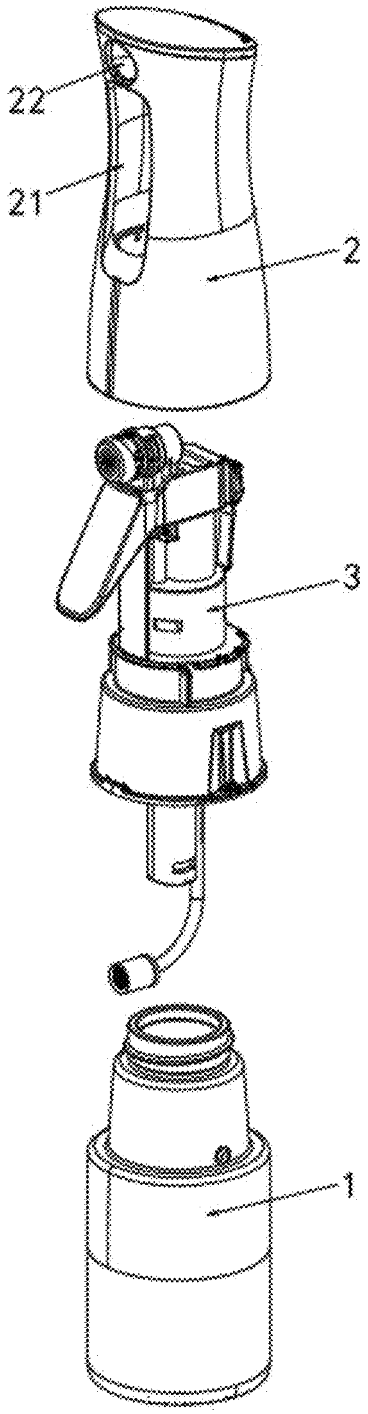
FIG. 1 is a schematic diagram of a disassembly structure according to the present disclosure.

Reference numerals in the accompany drawings: 1. oil storage container; 2. shroud shell; 21. reserved handle hole; 22. first reserved nozzle hole; 3. oil pumping module; 31. oil pumping shell body; 311. container connecting shell; 312. connecting shell; 313. oil pumping piston cylinder; 314. first oil channel; 315. handle connecting protrusion; 316. shaft hole; 317. valve body accommodating cavity; 318. second oil channel; 319. third oil channel; 32. handle; 321. shaft body; 322. trigger protrusion; 323. second reserved nozzle hole; 33. oil pumping piston; 34. first spring; 35. oil pumping valve; 351. sleeve shell; 352. oil storage piston cylinder; 353. valve core; 354. fourth oil channel; 355. oil pumping connecting pipe; 356. first valve core tube; 357. second valve core tube; 358. first valve ball; 359. second valve ball, 3510. oil suction pipe; 3511. oil filter; 3512. oil storage piston; 3513. piston supporting rod; 3514. second spring; 36. atomizing nozzle; 361. nozzle shell; 362. fifth oil channel; 363. spring limiting cylinder; 364. exhaust hole; 365. oil outlet piston; 366. third spring; 367. reverse thrusting groove; 368. plunger; 369. oil outlet piston cylinder; 3610. atomizing head; and 3611. nozzle cover.

DETAILED DESCRIPTIONS OF THE EMBODIMENTS

The technical solutions in the embodiments of the present disclosure are described below clearly and comprehensively in conjunction with the accompanying drawings in the embodiments of the present disclosure. It is obvious that the embodiments described are merely a part of, not all of, embodiments of the present disclosure. All other embodiments obtained by those of ordinarily skilled in the art based on the embodiments of the present disclosure without making creative efforts fall within the scope of protection of the present disclosure.

Figure 2:
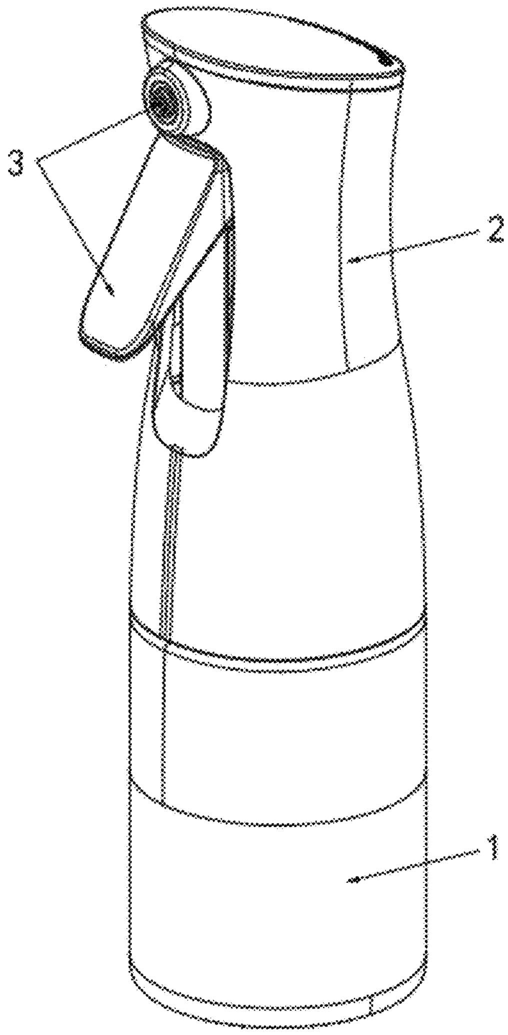
FIG. 2 is a schematic diagram of an assembly structure according to the present disclosure.

With reference to FIGS. 1 and 2, the present disclosure provides a technical solution: an oil spray bottle, which is composed of three modules, that is, an oil storage container 1, a shroud shell 2 and an oil pumping module 3. In order to facilitate the pouring of oil into the oil storage container 1, the oil storage container 1 is designed to be capable of being detached from the oil pumping module 3, the oil storage container is in threaded connection with the oil pumping module, that is, an external thread is formed at an opening of the oil storage container 1, and an inner thread is formed on an inner wall of the oil pumping module 3; in order to hide the oil pumping module 3, improve its aesthetics and enable a user to hold the oil spray bottle easily, the shroud shell 2 is fixed to an outside of the oil pumping module 3; and further, in order to facilitate operation and oil spraying, a reserved handle hole 21 and a first reserved nozzle hole 22 are formed on a side portion of the shroud shell 2, a handle 32 is exposed to an outside through the reserved handle hole 21, and an atomizing nozzle 36 is exposed to an outside through the first reserved nozzle hole 22.

Figure 3:
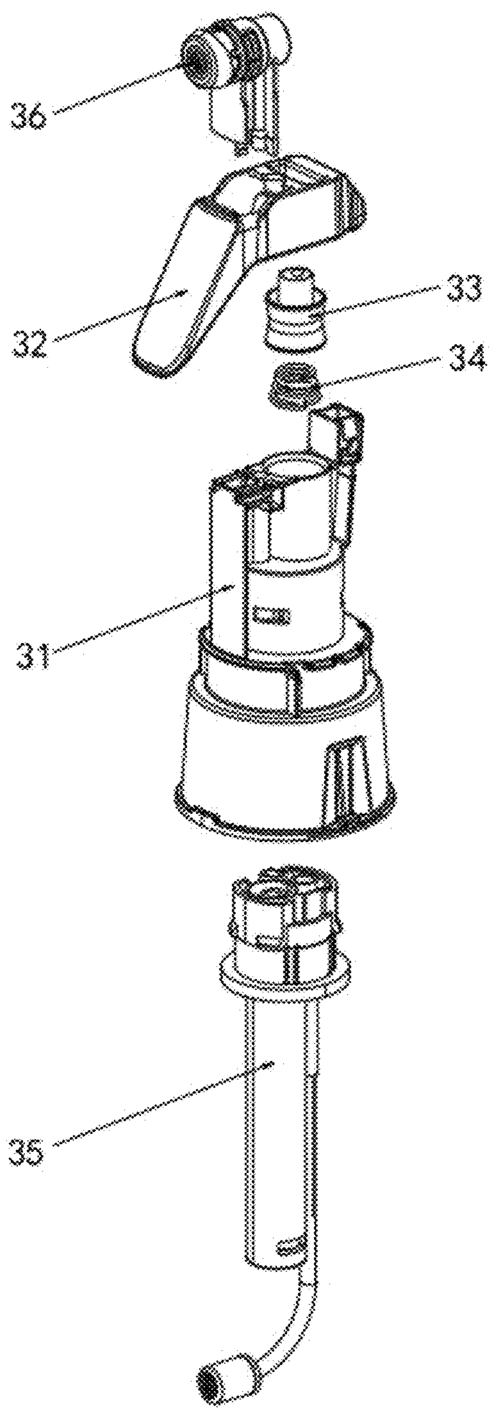
FIG. 3 is a schematic diagram of a disassembly structure of an oil pumping module according to the present disclosure.
Figure 4:
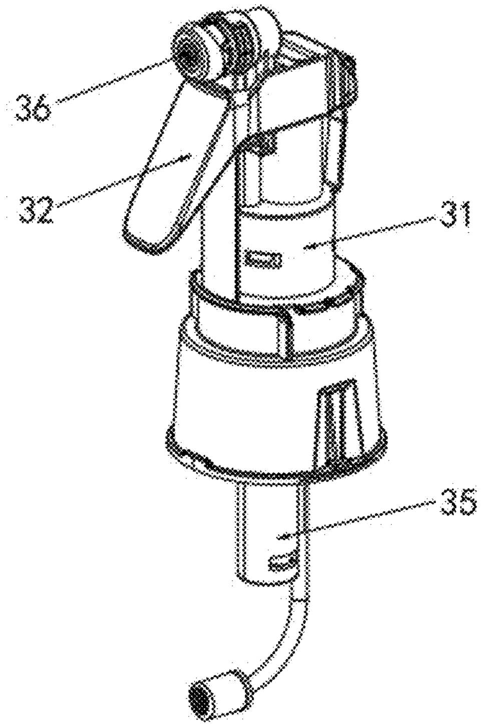
FIG. 4 is a schematic diagram of an assembly structure of an oil pumping module according to the present disclosure.

With reference to FIGS. 3 and 4, the oil pumping module 3 includes an oil pumping shell body 31 and the handle 32, the handle 32 can reciprocate rotationally at a top end of the oil pumping shell body 31, a trigger protrusion 322 is integrally connected to an interior of the handle 32, an oil pumping piston 33 is movably disposed at a top of the oil pumping shell body 31, the trigger protrusion 322 is abutted against the oil pumping piston 33, and the oil pumping piston 33 and the oil pumping shell body 31 are both abutted against a first spring 34 there between, an oil pumping valve 35 is connected inside the oil pumping shell body 31, when the user presses the handle 32, the handle 32 drives the trigger protrusion 322 to move, when the trigger protrusion 322 is transited from a highest point to a lowest point, the oil pumping piston 33 will be pressed downwards by the trigger protrusion 322, and at the same time, a downward movement of the oil pumping piston 33 will press the first spring 34 to contract and store force; and when the user releases the handle 32, the first spring 34 is restored to push the oil pumping piston 33 to move upwards, and the handle 32 can also restore an initial position, and when this process is performed in a reciprocating manner, the oil can be pumped out.

With reference to FIGS. 3, 4, 10, 11, 12 and 13, the oil pumping module 3 further includes an atomizing nozzle 36 fixedly snap-fitted on the top end of the oil pumping shell body 31, the atomizing nozzle 36 has a nozzle shell 361 as a main body structure thereof, a fifth oil channel 362 is formed at a bottom of the nozzle shell 361, a spring limiting cylinder 363 is integrally connected to a top of the nozzle shell 361, an oil outlet piston 365 is movably disposed inside the spring limiting cylinder 363, the oil outlet piston 365 and the spring limiting cylinder 363 are both abutted against a third spring 366, a reverse thrusting groove 367 is formed on an outer portion of the oil outlet piston 365, a plunger 368 is connected to an end portion of the oil outlet piston 365, an oil outlet piston cylinder 369 is connected to an end portion of the nozzle shell 361, the plunger 368 is capable of blocking an oil outlet channel of the oil outlet piston cylinder 369, an exhaust hole 364 is reserved and formed on a side wall of spring limiting cylinder 363, an oil reservoir is reserved between the spring limiting cylinder 363 and the nozzle shell 361, an atomizing head 3610 is connected to an end portion of the oil outlet piston cylinder 369, a nozzle cover 3611 is connected to an outer side of the end portion of the nozzle shell 361, and an oil spraying outlet of the atomizing head 3610 extends to an outside of the nozzle cover 3611; and in the process of oil pumping, the oil continuously enters the oil reservoir reserved between the spring limiting cylinder 363 and the nozzle shell 361 through the fifth oil channel 362, and with increasing oil pressure in the oil reservoir is increasing, the oil outlet piston 365 is pushed by the reverse thrusting groove 367 due to the oil pressure; when the oil pressure exceeds a critical contraction value of the third spring 366, the third spring 366 will contract and store force, causing the oil outlet piston 365 to move rightwards in whole, in which case, the plunger 368 will be detached from the oil outlet piston cylinder 369 and will not block the oil outlet channel of the oil outlet piston cylinder 369 any longer, in which case, the oil under the current oil pressure will be discharged through the oil outlet channel, after which the oil pressure inside the oil reservoir is reduced, the third spring 366 is extended, and the oil outlet piston 365 is accordingly pushed to move leftwards, such that the plunger 368 blocks the oil outlet channel of the oil outlet piston cylinder 369 again, that is to say, new oil will be pumped into the oil reservoir when the handle 32 is pressed each time, and the oil pressure inside the oil reservoir will be increased during each pumping, such that oil will be sprayed out through the atomizing head 3610 when the handle 32 is pressed each time.

Figure 5:
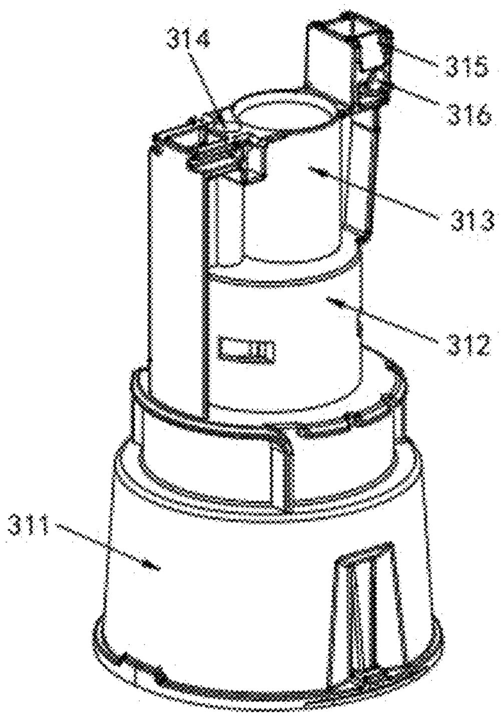
FIG. 5 is an external schematic diagram of an oil pumping shell body according to the present disclosure.
Figure 6:
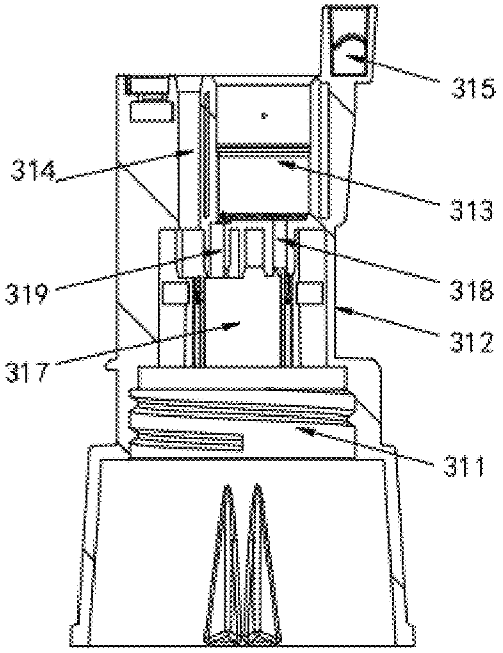
FIG. 6 is a semi-sectional view of an oil pumping shell body according to the present disclosure.
Figure 7:
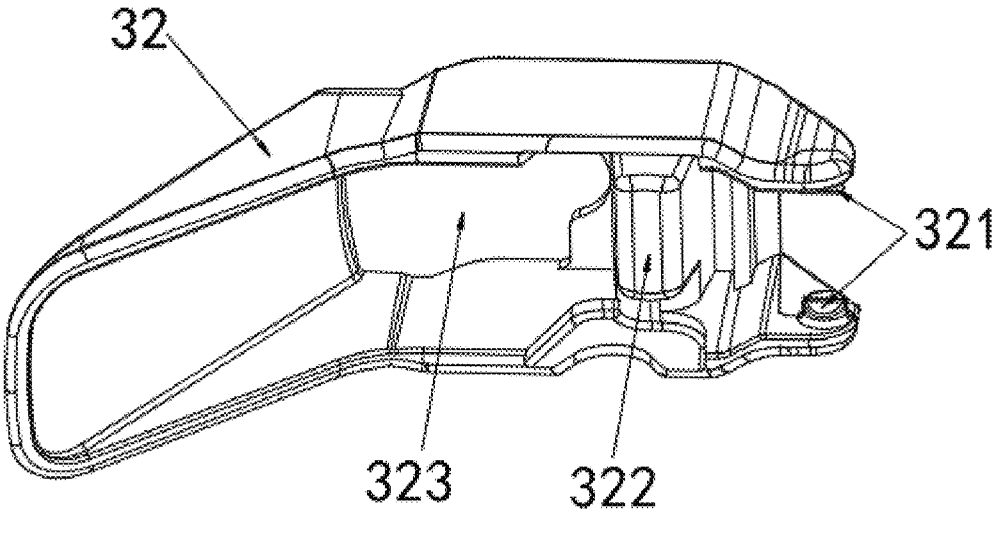
FIG. 7 is a structural schematic diagram of a handle according to the present disclosure.

With reference to FIGS. 5, 6, and 7, the oil pumping shell body 31 includes a container connecting shell 311, the container connecting shell 311 is in threaded connection with the opening of the oil storage container 1, an upper portion of the container connecting shell 311 is integrally connected to a connecting shell 312, an upper portion of the connecting shell 312 is integrally connected to an oil pumping piston cylinder 313, the oil pumping piston 33 and the first spring 34 are both located inside the oil pumping piston cylinder 313, the oil pumping piston 33 can reciprocate up and down inside the oil pumping piston cylinder 313, a first oil channel 314 is formed on one side of the oil pumping piston cylinder 313, the fifth oil channel 362 is communicated with the first oil channel 314, a valve body accommodating cavity 317 is formed inside the connecting shell 312, a sleeve shell 351 is fixed inside the valve body accommodating cavity 317, a second oil channel 318 and a third oil channel 319 are formed on a top of the connecting shell 312, the connecting shell 312 is communicated with the oil pumping piston cylinder 313 through the second oil channel 318 and the third oil channel 319, a handle connecting protrusion 315 is integrally connected to the other side of the oil pumping piston cylinder 313, one shaft hole 316 is formed on both front and back sides of the handle connecting protrusion 315, a shaft body 321 is symmetrically connected to an end portion of the handle 32, and the shaft body 321 is rotationally connected into the shaft holes 316, such that the handle 32 can be pressed; and a second reserved nozzle hole 323 is formed on a top of the handle 32, and an atomizing nozzle 36 extends to a position above the handle 32 through the second reserved nozzle hole 323.

Figure 8:
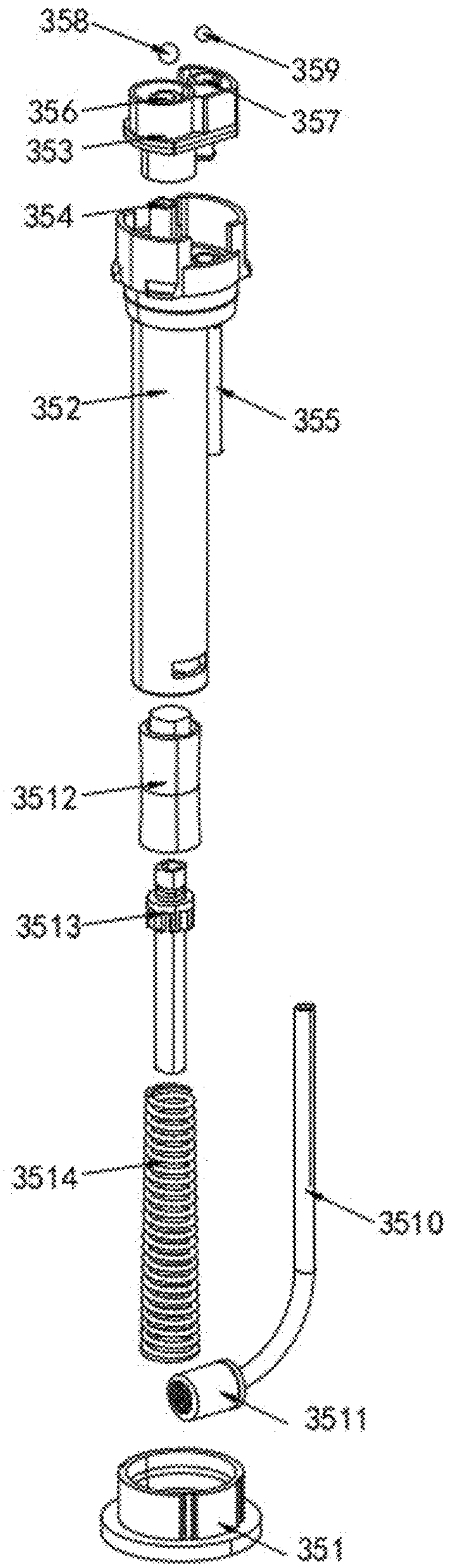
FIG. 8 is a schematic diagram of a disassembly structure of an oil pumping valve according to the present disclosure.
Figure 9:
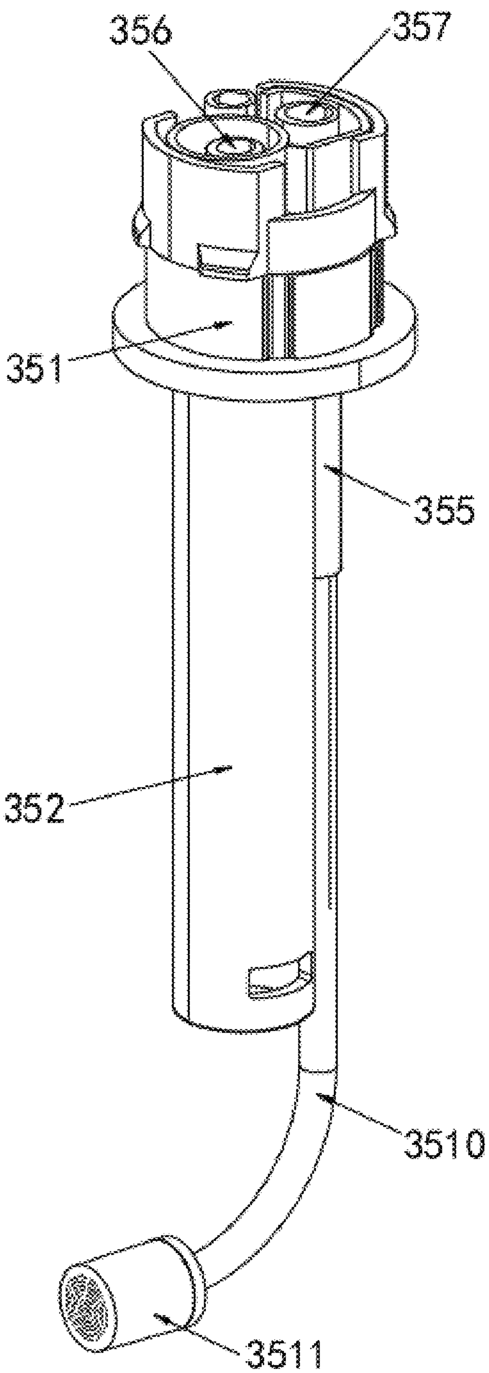
FIG. 9 is a schematic diagram of an assembly structure of an oil pumping valve according to the present disclosure.
Figure 10:
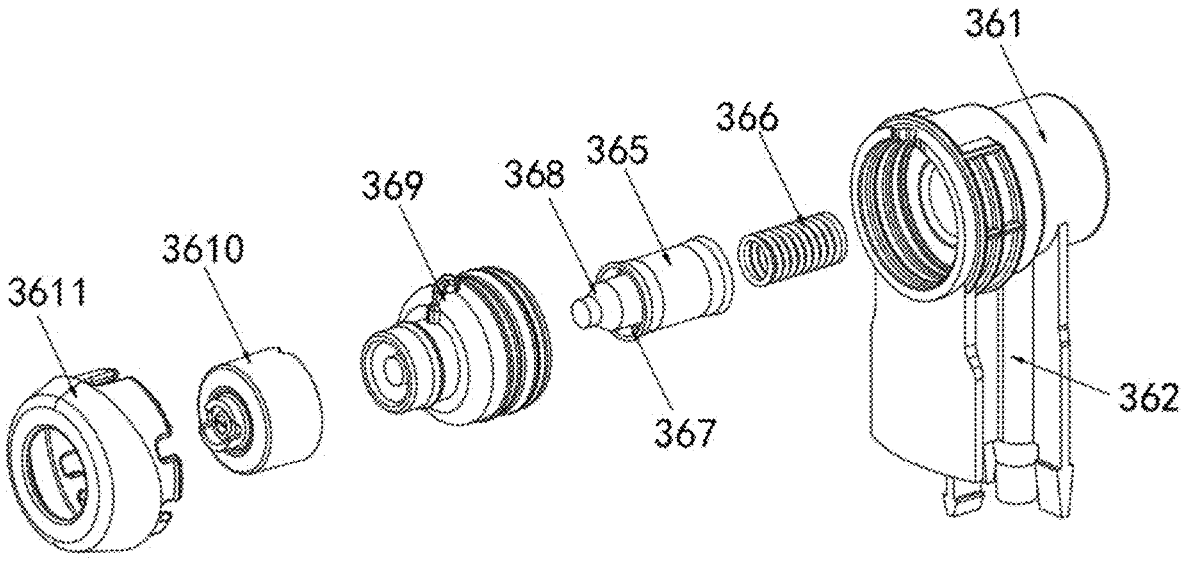
FIG. 10 is a schematic diagram of a disassembly structure of an atomizing nozzle according to the present disclosure.
Figure 11:
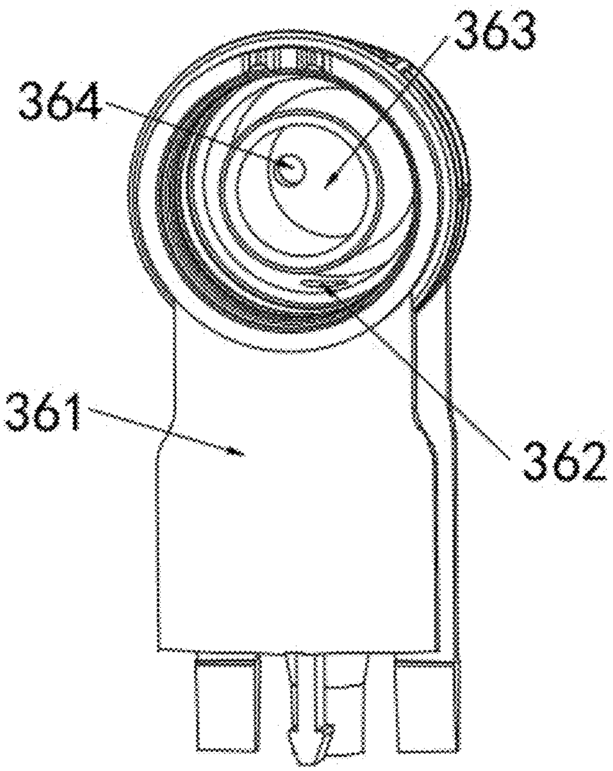
FIG. 11 is a schematic diagram of an internal structure of a nozzle shell according to the present disclosure.
Figure 12:
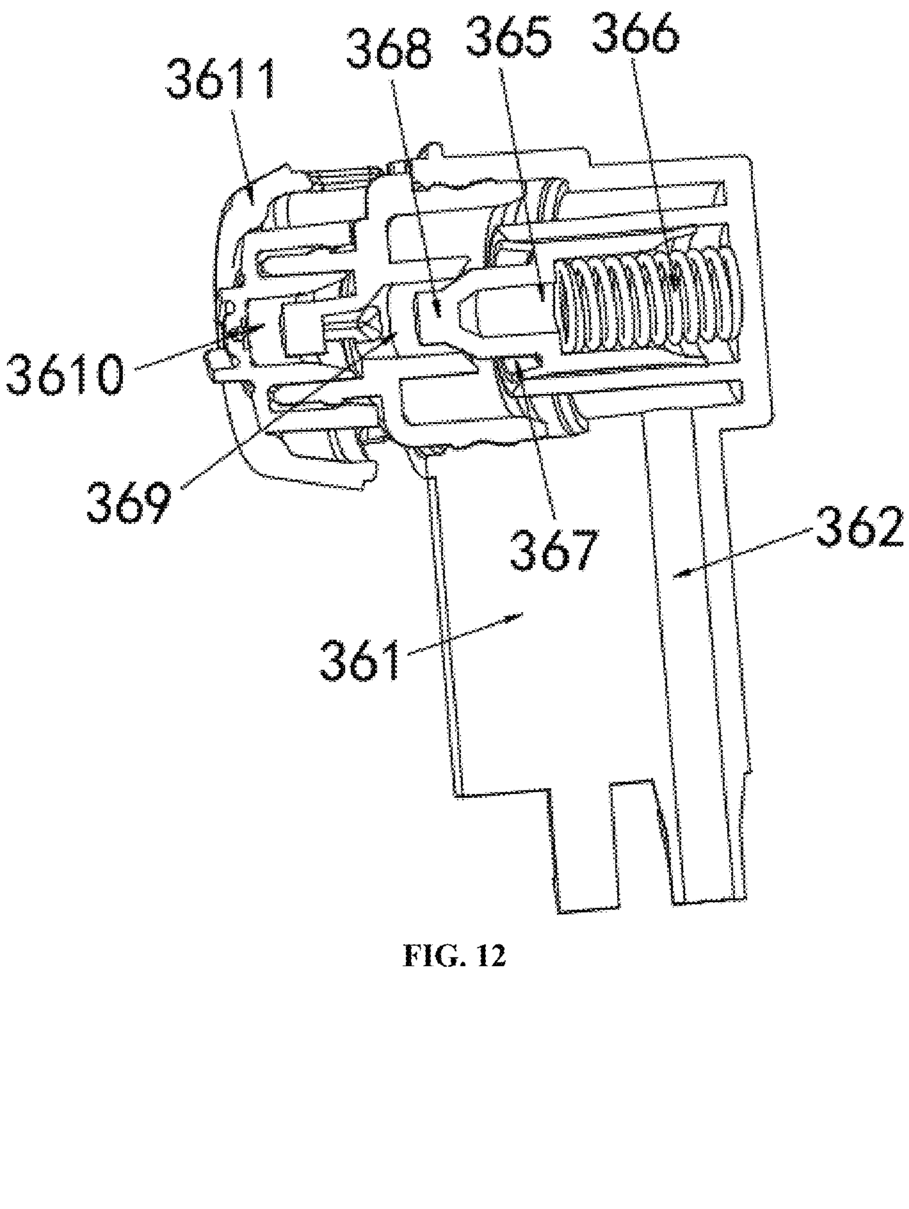
FIG. 12 is a semi-sectional view of an atomizing nozzle after assembly according to the present disclosure.
Figure 13:
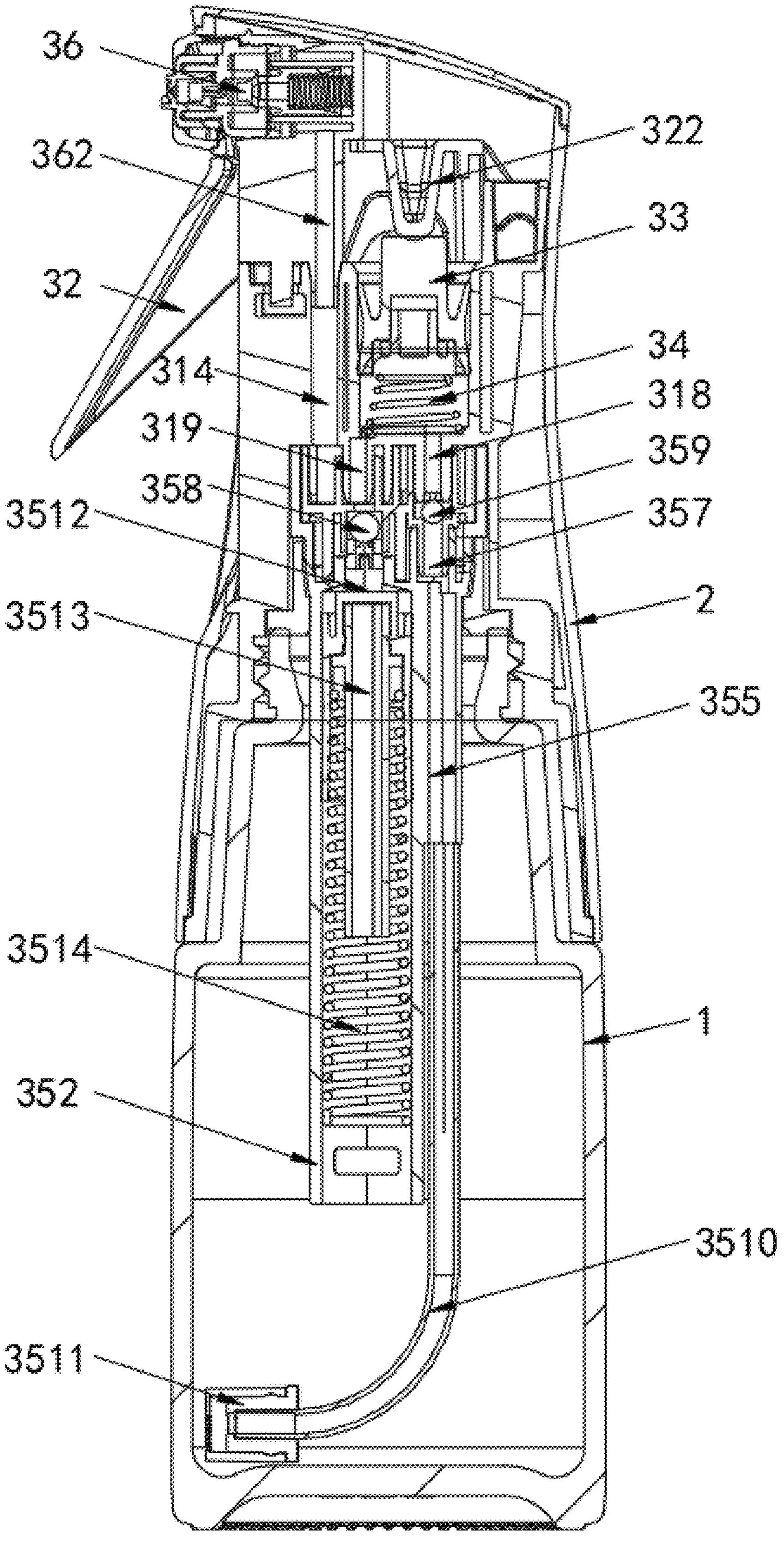
FIG. 13 is a semi-sectional view of the present disclosure after assembly.

With reference to FIGS. 8 and 9, the oil pumping valve 35 includes a sleeve 351 fixed inside the oil pumping shell body 31, an oil storage piston cylinder 352 is fixedly engaged inside the sleeve 351, a fourth oil channel 354 is formed on a top of the oil storage piston cylinder 352, an oil pumping connecting pipe 355 is connected to a side of the oil storage piston cylinder 352, an oil suction pipe 3510 is connected to a bottom end of the oil pumping connecting pipe 355, an oil filter 3511 is connected to a bottom end of the oil suction pipe 3510, the oil filter 3511 is of a filter mesh structure capable of filtering the sucked oil, a valve core 353 is connected to an inner top side of the oil storage piston cylinder 352, a first valve core tube 356 is disposed on one side of an interior of the valve core 353, a second valve core tube 357 is disposed on the other side of the interior of the valve core 353, a first valve ball 358 is movably disposed inside the first valve core tube 356, a second valve ball 359 is movably disposed inside the second valve core tube 357, an oil storage piston 3512 is movably connected to an interior of the oil storage piston cylinder 352, a piston supporting rod 3513 is fixedly connected to an interior of the oil storage piston 3512, a second spring 3514 is sleeved outside the piston supporting rod 3513, the second spring 3514 is abutted between the piston supporting rod 3513 and the oil storage piston cylinder 352, the fourth oil channel 354 is communicated with the oil storage piston cylinder 352 and the first valve core tube 356, the oil pumping connecting pipe 355 is communicated with the second valve core tube 357, and the oil storage piston cylinder 352 is communicated with the first oil channel 314.

Figure 14:
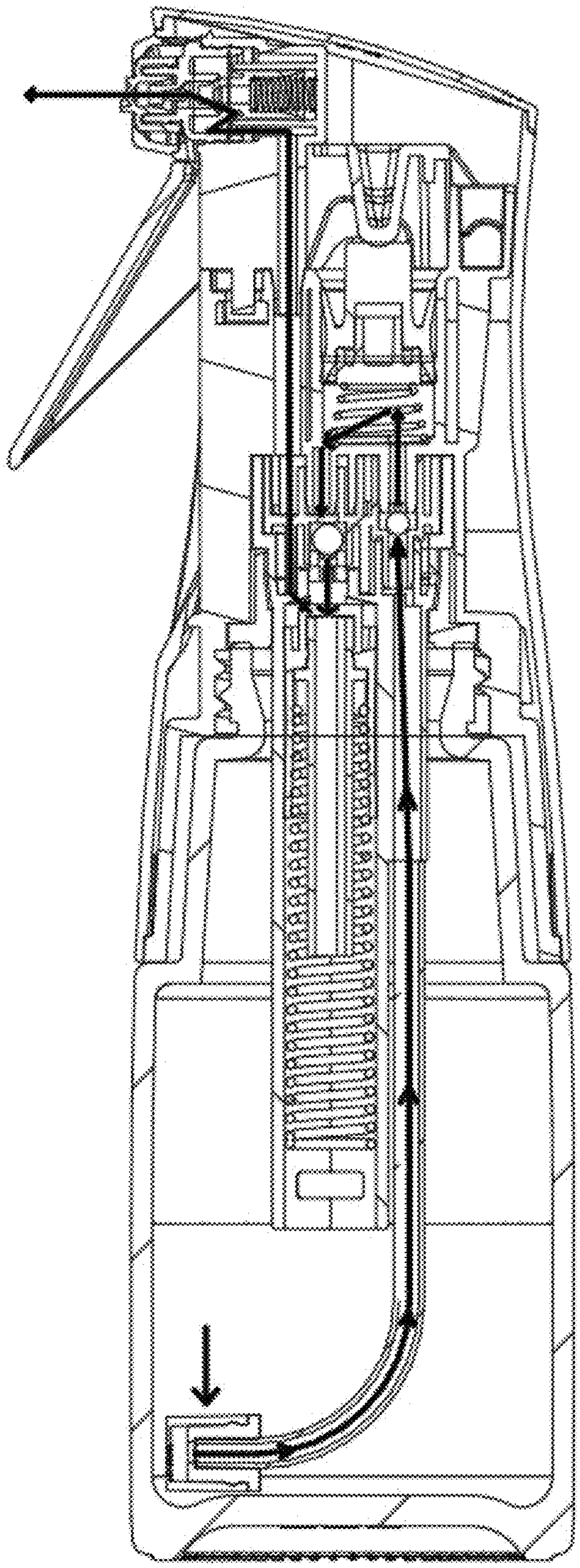
FIG. 14 is a schematic diagram of a path of oil in a pumping process according to the present disclosure.

When the oil spray bottle is in use and the oil needs to be sprayed out, the user presses the handle 32 to make the oil pumping piston 33 move up and down to create a pressure difference, such that an interior of the oil pumping piston cylinder 313 is in a negative pressure state, in which case, the first valve ball 358 and the second valve ball 359 are sucked and moved upwards through the negative pressure in the second oil channel 318 and the third oil channel 319, when the second valve ball 359 is moved upwards, the oil will pass through the oil filter 3511, the oil suction pipe 3510, the oil pumping connecting pipe 355 and the second valve core tube 357 to enter the second oil channel 318, and then enter to the oil pumping piston cylinder 313, and the downward movement of the first valve ball 358 will allow the oil pumped up just now inside the oil pumping piston cylinder 313 to be pumped into the fourth oil channel 354 through the third oil channel 319; and with increasing number of the pumping times, an oil pressure inside the oil storage piston cylinder 352 will continuously increase due to communication between the fourth oil channel 354 and the oil storage piston cylinder 352, the oil pressure will then push the oil storage piston 3512 to move downwards, and the piston supporting rod 3513 will compress the second spring 3514, in which case, a portion of the oil will be pumped into the first oil channel 314 each time when the oil pressure increases, the oil will pass through the first oil channel 314 to enter the fifth oil channel 362, and be then sprayed out through the atomizing nozzle 36, and the oil path direction as described above can be seen in FIG. 14.

What it claimed is:

1. An oil spray bottle, comprising an oil storage container, a shroud shell and an oil pumping module, the oil storage container and the oil pumping module can be disassembled and assembled, and the shroud shell is fixed to an outside of the oil pumping module; wherein the oil pumping module comprises an oil pumping shell body and a handle, the handle can reciprocate rotationally at a top end of the oil pumping shell body, a trigger protrusion is integrally connected to an interior of the handle, an oil pumping piston is movably disposed at a top of the oil pumping shell body, the trigger protrusion is abutted against the oil pumping piston, and the oil pumping piston and the oil pumping shell body are both abutted against a first spring there between; and the oil pumping module further comprises an atomizing nozzle fixedly snap-fitted on the top end of the oil pumping shell body, the atomizing nozzle has a nozzle shell as a main body structure thereof, a fifth oil channel is formed at a bottom of the nozzle shell, a spring limiting cylinder is integrally connected to a top of the nozzle shell, an oil outlet piston is movably disposed inside the spring limiting cylinder, the oil outlet piston and the spring limiting cylinder are both abutted against a third spring, a reverse thrusting groove is formed on an outer portion of the oil outlet piston, a plunger is connected to an end portion of the oil outlet piston, an oil outlet piston cylinder is connected to an end portion of the nozzle shell, the plunger is capable of blocking an oil outlet channel of the oil outlet piston cylinder.

2. The oil spray bottle according to claim 1, wherein a reserved handle hole and a first reserved nozzle hole are formed on a side portion of the shroud shell, the handle is exposed to an outside through the reserved handle hole, and the atomizing nozzle is exposed to an outside through the first reserved nozzle hole.

3. The oil spray bottle according to claim 1, wherein the oil pumping shell body comprises a container connecting shell, the container connecting shell is in threaded connection with an opening of the oil storage container, an upper portion of the container connecting shell is integrally connected to a connecting shell, an upper portion of the connecting shell is integrally connected to an oil pumping piston cylinder, a first oil channel is formed on one side of the oil pumping piston cylinder, a valve body accommodating cavity is formed inside the connecting shell, a second oil channel and a third oil channel are formed on a top of the connecting shell, the connecting shell is communicated with the oil pumping piston cylinder through the second oil channel and the third oil channel.

4. The oil spray bottle according to claim 3, wherein a handle connecting protrusion is integrally connected to the other side of the oil pumping piston cylinder, and one shaft hole is formed on both front and back sides of the handle connecting protrusion; and a shaft body is symmetrically connected to an end portion of the handle, and the shaft body is rotationally connected into the shaft holes, a second reserved nozzle hole is formed on a top of the handle, and an atomizing nozzle extends to a position above the handle through the second reserved nozzle hole.

5. The oil spray bottle according to claim 1, wherein an oil pumping valve is connected inside the oil pumping shell body, the oil pumping valve comprises a sleeve fixed inside the oil pumping shell body, an oil storage piston cylinder is fixedly engaged inside the sleeve, a fourth oil channel is formed on a top of the oil storage piston cylinder, an oil pumping connecting pipe is connected to a side of the oil storage piston cylinder, an oil suction pipe is connected to a bottom end of the oil pumping connecting pipe, an oil filter is connected to a bottom end of the oil suction pipe.

6. The oil spray bottle according to claim 5, wherein a valve core is connected to an inner top side of the oil storage piston cylinder, a first valve core tube is disposed on one side of an interior of the valve core, a second valve core tube is disposed on the other side of the interior of the valve core, a first valve ball is movably disposed inside the first valve core tube, and a second valve ball is movably disposed inside the second valve core tube.

7. The oil spray bottle according to claim 5, wherein an oil storage piston is movably connected to an interior of the oil storage piston cylinder, a piston supporting rod is fixedly connected to an interior of the oil storage piston, a second spring is sleeved outside the piston supporting rod, and the second spring is abutted between the piston supporting rod and the oil storage piston cylinder.

8. The oil spray bottle according to claim 6, wherein the fourth oil channel is communicated with the oil storage piston cylinder and the first valve core tube, the oil pumping connecting pipe is communicated with the second valve core tube, and the oil storage piston cylinder is communicated with the first oil channel.

9. The oil spray bottle according to claim 1, wherein the fifth oil channel is communicated with the first oil channel, an exhaust hole is reserved and formed on a side wall of spring limiting cylinder, and an oil reservoir is reserved between the spring limiting cylinder and the nozzle shell.

10. The oil spray bottle according to claim 1, wherein an atomizing head is connected to an end portion of the oil outlet piston cylinder, a nozzle cover is connected to an outer side of the end portion of the nozzle shell, and an oil spraying outlet of the atomizing head extends to an outside of the nozzle cover.

* * * * *